(12) United States Patent
Sugie

(10) Patent No.: US 11,789,423 B2
(45) Date of Patent: Oct. 17, 2023

(54) PROGRAMMABLE LOGIC CONTROLLER

(71) Applicant: DENSO WAVE INCORPORATED, Aichi-pref. (JP)

(72) Inventor: Toshiyuki Sugie, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 17/565,689

(22) Filed: Dec. 30, 2021

(65) Prior Publication Data

US 2022/0308546 A1 Sep. 29, 2022

(30) Foreign Application Priority Data

Mar. 24, 2021 (JP) ................................. 2021-050011

(51) Int. Cl.
*G05B 19/05* (2006.01)

(52) U.S. Cl.
CPC .... *G05B 19/052* (2013.01); *G05B 2219/1203* (2013.01)

(58) Field of Classification Search
CPC .......... G05B 19/052; G05B 2219/1203; G05B 19/058
See application file for complete search history.

(56) References Cited

U.S. PATENT DOCUMENTS

2014/0108896 A1* 4/2014 Jung ................. B60W 50/0205
714/819
2020/0272121 A9* 8/2020 He ..................... G05B 19/0421

FOREIGN PATENT DOCUMENTS

JP 2019-020822 A 2/2019

* cited by examiner

*Primary Examiner* — Kenneth M Lo
*Assistant Examiner* — Mohammed Shafayet
(74) *Attorney, Agent, or Firm* — Oliff PLC

(57) ABSTRACT

Provided is a programmable logic controller comprising: a CPU module; and an input module that generates internal data corresponding to an input signal input from the outside, wherein the input module includes a first control unit and a second control unit, the second control unit generates the second control data by encoding second input data into data that cannot be decoded by the first control unit, the first control unit outputs the first control data including first input data and the second control data, the input module generates the internal data based on the first control data and transmit the internal data to the CPU module and the CPU module extracts the first input data and the second input data to determine whether the input data is correct.

11 Claims, 13 Drawing Sheets

PROGRAMMABLE LOGIC CONTROLLER

CROSS-REFERENCE TO RELATED APPLICATION

This application is based on and claims the benefit of priority from earlier Japanese Patent Application No. 2021-050011 filed Mar. 24, 2021, the description of which is incorporated herein by reference.

BACKGROUND OF THE INVENTION

The present disclosure relates to an programmable logic controller.

Programmable logic controllers have an input module for taking input signals, which are analog or digital signals output from various sensors, various switches, and the like, into a CPU module that controls the overall operation of the programmable logic controller. Programmable logic controllers may be abbreviated as PLC herein.

SUMMARY

In an aspect of the present disclosure, a programmable logic controller is provided comprising: a CPU module; and an input module that generates internal data corresponding to an externally input signal input and transmits the internal data to the CPU module via communication, wherein the input module includes a first control unit that generates and outputs the internal data when the input signal is input, and a second control unit that generates and outputs second control data when the input signal is input, the second control unit generates the second control data by encoding second input data, which is input data corresponding to the input signal, into data that cannot be decoded by the first control unit, and transmits the second control data to the first control unit, the first control unit outputs the internal data including first input data, which is input data corresponding to the input signal, and the second control data, the input module generates the internal data based on the first control data and transmit the internal data to the CPU module, and the CPU module has a function of decoding the second control data, and extracts the first input data and the second input data from the internal data to determine whether the input data is correct by performing match comparison between the first input data and the second input data.

DETAILED DESCRIPTION OF THE PREFERRED EMBODIMENTS

Figure 1:
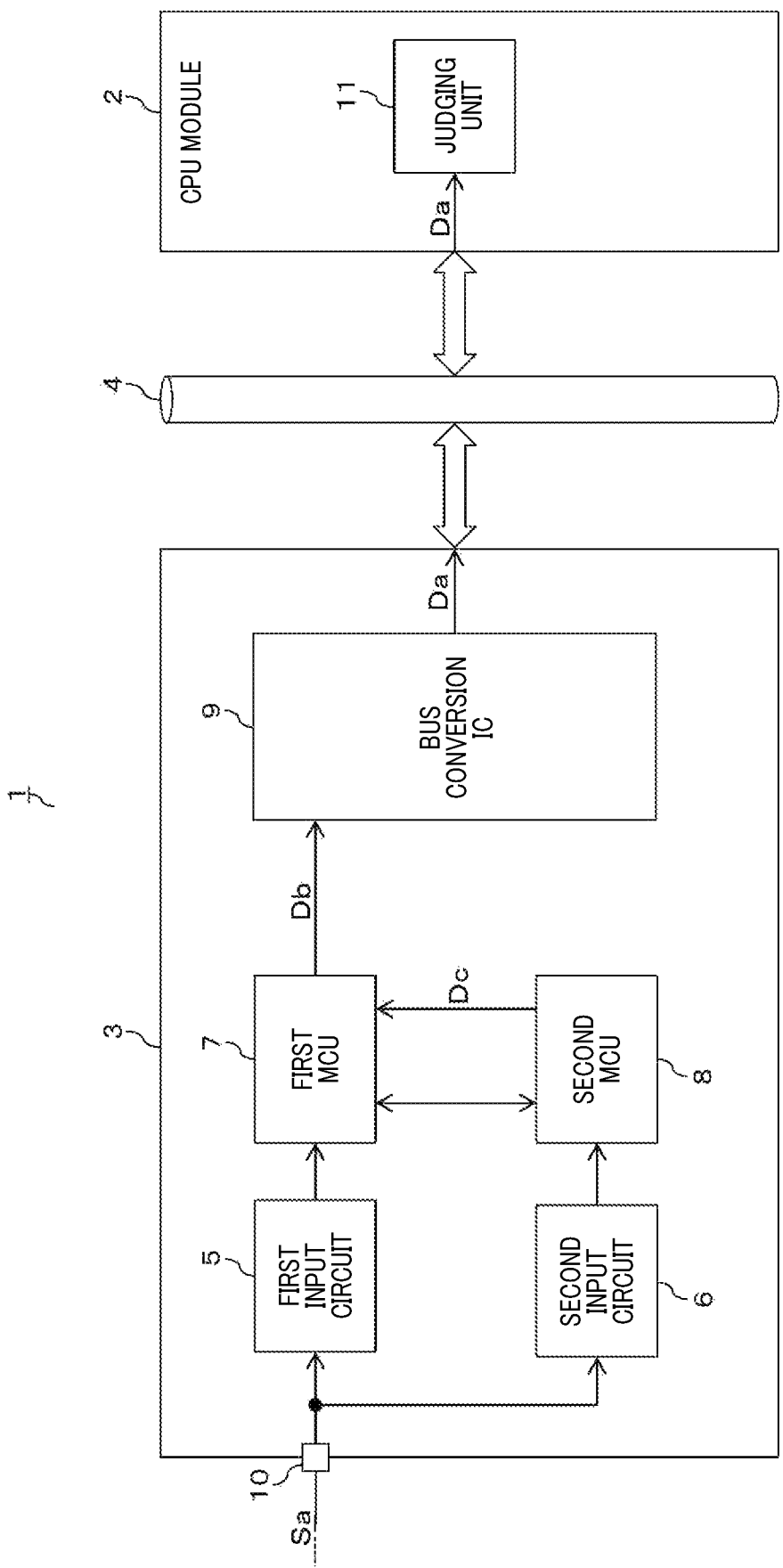
FIG. 1 is a diagram schematically showing the configuration of a PLC according to the first embodiment.

Preferred embodiments of the present disclosure will be described with reference to the attached drawings. First, prior to the detailed description of the embodiments of the present disclosure, what inspired the disclosers to devise the programmable logic controller according to the present disclosure will be described.

As described above, PLCs have an input module for taking input signals, which are analog or digital signals output from various sensors, various switches, and the like, into a CPU module that controls the overall operation of the programmable logic controller. With regard to such programmable logic controllers, the disclosers considered duplicating the input control, that is, the communication for taking in the input signals in order to enhance the reliability of data communication.

JP 2019-20822 A proposes, as a structure of a PLC input module designed to respond quickly to an external input, a structure including two micro controller units that output data corresponding to the input signal when an input signal is input. Micro controller units may be abbreviated as MCU herein.

However, the PLC disclosed in JP 2019-20822 A employs a plurality of MCUs in order to increase the speed, and does not duplicate the communication to improve the reliability. It may also be possible to adapt such a structure to duplicate the communication by, for example, configuring the structure such that the two MCUs each interprets input data corresponding to the same input signal and generates certain data, and the data generated by one of the MCUs (for example, a second MCU) is transmitted to the other MCU (a first MCU). The first MCU compares the data transmitted from the second MCU with the data it generated, and, if they match, transmits the data to the subsequent bus conversion IC (Integrated Circuit).

However, if this structure is adopted, when the first MCU compares the pieces of data to check if they match, each piece of data is processed in a singular state instead of a duplicated state. That is, in this structure, the first MCU can falsify the data transmitted from the second MCU. Therefore, if an abnormality or failure occurs in the first MCU, incorrect data may be transmitted to the subsequent stages. Further, in such a structure, if there is an abnormality or error in the data transmitted from the second MCU, decoding of the data by the first MCU may cause the first MCU or the subsequent bus conversion IC, and thus the PLC itself, to malfunction or stop due to the data having the abnormality or error.

After facing these problems, the disclosers studied the possibility of providing a programmable logic controller capable of duplicating the communication for taking in input signals and capable of carrying out highly reliable communication. The disclosers conducted an extensive investigation and arrived at the following programmable logic controller.

According to an aspect of the present disclosure, a programmable logic controller comprises a CPU module and an input module that generates internal data corresponding to an input signal input from the outside and transmits the internal data to the CPU module via communication. The input module includes a first control unit and a second control unit. The first control unit generates and outputs first control data when the input signal is input. The second control unit generates and outputs second control data when the input signal is input. The input module, which includes such first and second control units, is configured to generate and output internal data based on the first control data. As can be seen, this configuration alone does not physically duplicate the communication for taking the input signals into the CPU module.

However, a programmable logic controller according to the above configuration realizes virtual duplication which provides a function equivalent to that of physical duplication by providing the components with the following functions. Specifically, the second control unit generates the second control data by encoding second input data, which is input data corresponding to the input signal, into data that cannot be decoded by the first control unit, and transmits the second control data to the first control unit. The first control unit generates the first control data including first input data, which is input data corresponding to the input signal, and the second control data, and outputs it. Accordingly, the two control units, that is, the first and second control units of the above configuration play different roles. The generated first control data is converted into the corresponding internal data and is input to the CPU module.

In the above configuration, the CPU module has the function of decoding the second control data. The CPU module extracts the first input data and the second input data from the internal data, and determines whether the input data is correct by comparing the first input data and the second input data. In such a configuration, when there is an abnormality or failure in the second control unit, the second input data, and thus the second control data, may become different from what it should have been due to the abnormality or failure. However, in such a case, the result of the match comparison carried out by CPU module will be a mismatch, and an input data error, that is, a communication error is detected.

Further, in the above configuration, when there is an abnormality or failure in the first control unit, the first input data may be different from what it should have been due to the abnormality or failure. However, also in this case, the first control unit cannot decode the second control data transmitted from the second control unit. This makes it extremely unlikely that the second control data is tampered with by the first control unit in which an abnormality or failure has occurred. Therefore, in this case as well, the match comparison carried out by the CPU module results in a mismatch, and an input data error, that is, a communication error is detected. Thus, according to the above configuration, a function equivalent to that of a configuration in which the communication for taking the input signal into the CPU module is physically duplicated, more specifically, a mechanism capable of reliably detecting communication errors can be realized.

In addition, in the above configuration, the first control unit does not decode the second control data. Therefore, even if there is an abnormality or error in the second control data, the first control unit will not malfunction or stop due to the data as it does not decode the second control data.

Thus, according to the present disclosure, a programmable logic controller capable of duplicating the communication for taking in input signals and capable of performing highly reliable communication can be provided.

In addition, the black channel approach is known as a method for reducing the complexity of functional safety designing of network devices. A communication path admitted as a black channel can detect communication errors with a relatively high probability. Since the failure rate of the communication path becomes negligibly small, the degree of freedom of module coupling increases. In order to support a black channel, it is necessary to have a mechanism that can reliably detect communication errors on the application side, as well as verify it.

Since the programmable logic controller according to the present disclosure having the above-described configuration is capable of performing highly reliable communication, it can also support a black channel with regard to the communication path.

The first control unit may generate the first control data by integrating the first input data, which is input data corresponding to the input signal, with the second control data, and output it. This makes it possible to transmit the corresponding first input data and second control data together.

In the above-described programmable logic controller, the first control unit may be configured to generate the first control data by encoding the first input data into first encoded data, and integrating the first encoded data with the second control data. According to such a configuration, the first control data, and thus the internal data transmitted from the input module to the CPU module, is entirely encoded. This makes it difficult for, for example, a malicious third party to tamper with the data and improves its security. In addition, according to the above-described configuration, since the amount of internal data that is encoded entirely can be reduced as compared with partially encoded internal data, it is possible to contribute in making improvements to the communication between the input module and the CPU module such as reducing the load and realizing high speed.

In the above-described programmable logic controller, the first control unit may be configured to generate the first control data by integrating the first input data with the second control data and encoding them. According to such a configuration, the first control data, and thus the internal data transmitted from the input module to the CPU module, is entirely encoded. This makes it difficult for, for example, a malicious third party to tamper with the data and improves its security. In addition, according to the above-described configuration, since the amount of internal data that is encoded entirely can be reduced as compared with partially encoded internal data, it is possible to contribute in making improvements to the communication between the input module and the CPU module such as reducing the load and realizing high speed.

In the above-described programmable logic controller, the first control unit may be configured to generate the first control data by integrating the first encoded data with the second control data, and encoding the first encoded data and the second control data in a manner that is different from how the first encoded data is generated. That is, in this case, the internal data is generated by being encoded twice with respect to the original first input data and second input data. Therefore, according to the above configuration, for example, it becomes more difficult for a malicious third party to tamper with the data, and its security is further improved. Further, according to the above configuration, since the amount of the internal data can be further reduced owing to the double encoding, it is possible to contribute in making improvements to the communication between the input module and the CPU module such as further reducing the load and realizing an even higher speed.

When the input signal input from the outside is an analog signal, if there is a difference in timing between the first input data and the second input data, the result of match comparison performed by the CPU module becomes a mismatch even if the input data is correct, and the input data may be erroneously determined to be incorrect. Therefore, in the above programmable logic controller, the first input data and the second control data included in the first control data may be pieces of data corresponding to the input signals of the same timing. This ensures that the first input data and the second input data compared by the CPU module are pieces of data of the same time, which makes it possible to accurately determine whether the input data is correct by the match comparison performed by the CPU module even when the input signal is an analog signal. A plurality of embodiments will be described with reference to the drawings. Components of different embodiments that are substantially the same are denoted by the same reference sign, and their description will not be repeated.

First Embodiment

A programmable logic controller according to the first embodiment will be described with reference to FIGS. 1 to 4.

As shown in FIG. 1, a PLC 1 which is a programmable logic controller includes a CPU module 2 and an input module 3, and components such as an output module which are not shown. The modules constituting the PLC 1 including the CPU module 2 and the input module 3 are configured to be able to communicate with each other via a bus communication line 4. Note that, in this embodiment, the communication via the bus communication line 4 is based on an industrial network standard such as Ethernet/IP, EtherCAT, or PROFINET.

The input module 3 is a module for taking input signals Sa input from the outside into the CPU module 2, and it includes components such as a first input circuit 5, a second input circuit 6, a first MCU 7, a second MCU 8, and a bus conversion IC 9. In this embodiment, the input signals Sa are analog signals output from various sensors, various switches, and the like. In this case, the input module 3 generates internal data Da corresponding to the input signal Sa and transmits the internal data Da to the CPU module 2 via communication.

The first input circuit 5 converts the input signal Sa provided via a terminal 10 into a signal at a level that can be input to the first MCU 7, and outputs the converted signal to the first MCU 7. In this embodiment, the first input circuit 5 is an A/D conversion circuit. Therefore, the first input circuit 5 converts the input signal Sa, which is an analog signal provided via the terminal 10, into a digital signal and outputs it to the first MCU 7. The second input circuit 6 converts the input signal Sa into a signal at a level that can be input to the second MCU 8 and outputs the converted signal to the second MCU 8. In this embodiment, the second input circuit 6 is an A/D conversion circuit. Therefore, the second input circuit 6 converts the input signal Sa, which is an analog signal provided via the terminal 10, into a digital signal and outputs it to the second MCU 8. The signals after such level conversion are signals similar to the input signal Sa except that their levels are different. Therefore, in the following description, the signals after level conversion are also referred to as input signals Sa.

When the level of the input signal Sa provided from the outside is within the range of levels that can be input to the first MCU 7 and the second MCU 8, the first input circuit 5 and the second input circuit 6 can be omitted. The first MCU 7 generates and outputs first control data db when the input signal Sa is input, and it serves as a first control unit. The second MCU 8 generates and outputs second control data Dc when the input signal Sa is input, and it serves as a second control unit.

The first control data db output from the first MCU 7 is input to the bus conversion IC 9. The bus conversion IC 9 converts the first control data db into internal data Da such as a communication packet in accordance with the communication. That is, the bus conversion IC 9 generates and outputs internal data Da based on the first control data db when the first control data db is input, and it serves as a data generating unit. In the bus conversion IC 9, the internal data Da is generated by software processing. The bus conversion IC 9 transmits communication data including the generated internal data Da to the CPU module 2 by communication.

The second MCU 8 acquires second input data, which is input data corresponding to the input signal Sa and is generated by A/D conversion and other processing on the input signal Sa. The second MCU 8 generates second control data Dc by encoding the second input data into data that cannot be decoded by the first MCU 7, and transmits the second control data Dc to the first MCU 7. The first MCU 7 acquires first input data, which is input data corresponding to the input signal Sa and is generated by A/D conversion and other processing on the input signal Sa. The first MCU 7 generates the first control data db by integrating the first input data with the second control data Dc transmitted from the second MCU 8. The first input data acquired by the first MCU 7 and the second input data acquired by the second MCU 8 will be the same data if there is no abnormality or failure.

The pieces of data integrated together in the first MCU 7 are pieces of data corresponding to the input signals Sa of the same timing, in other words, the integrated pieces of data are synchronized. The synchronization of the pieces of data is achieved as follows. That is, the first MCU 7 includes a memory (storage unit) such as a flash ROM or a RAM, and the first input data and the second control data Dc transmitted from the second MCU 8 are stored in the memory. In this way, the second MCU 8 stores the generated second control data Dc in the memory of the first MCU 7 instead of its own memory.

The storage area of the memory of the first MCU 7 is divided into sub-areas each corresponding to a different data reception time period having a very short predetermined length, and pieces of data for which the same data reception time have been set are stored in the same area. The first MCU 7 reads out the first input data and the second control data Dc stored in the same area, and then integrates the pieces of data together by concatenating them to generate the first control data db. The synchronism and simultaneity of the pieces of data integrated in the first MCU 7 are thus ensured.

The CPU module 2 includes a judging unit 11 having the function of decoding the second control data Dc. The judging unit 11 is realized by software processing. The judging unit 11 receives the internal data Da. The judging unit 11 knows the structure of the internal data Da including the data concatenation rules. Therefore, the judging unit 11 can divide the input internal data Da into the first input data and the second control data Dc. Then, the judging unit 11 acquires the second input data by decoding the second control data Dc which is encoded data. In this way, the judging unit 11 extracts the first input data and the second input data from the internal data Da, and determines whether the input data is correct by comparing the first input data and the second input data.

In the above configuration, serial communication is performed between the first MCU 7 and the second MCU 8, and mutual monitoring between the first MCU 7 and the second MCU 8 is realized. Such mutual monitoring is repeated along with other operations at relatively long time intervals such as one hour.

Next, the specific operations carried out by the above configuration will be described with reference to FIGS. 2 to 4.

Processing by Second MCU 8

Figure 2:
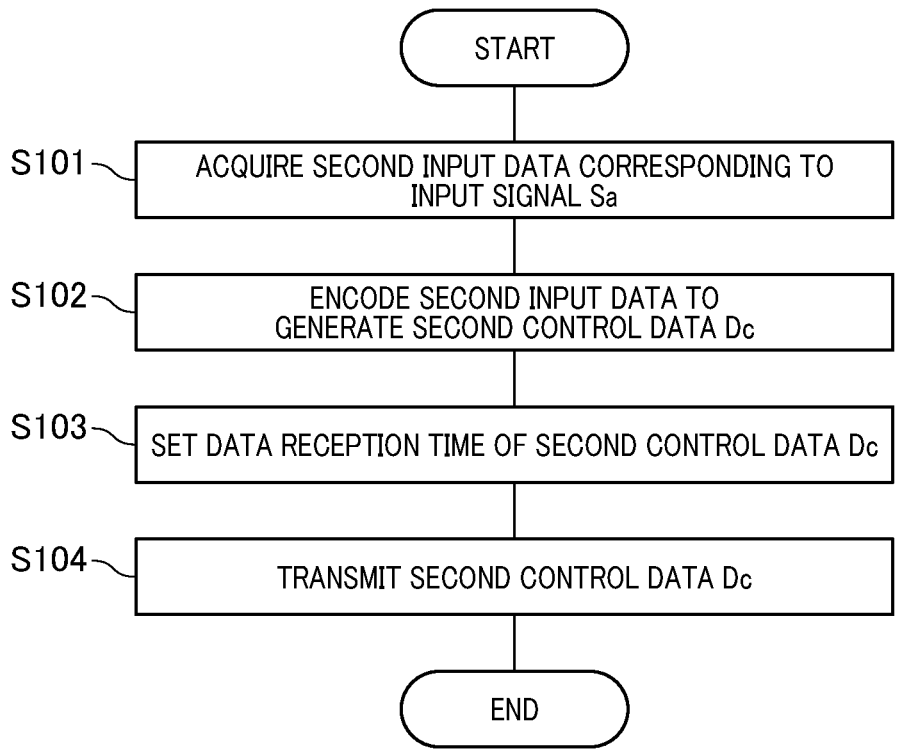
FIG. 2 is a flowchart showing an example of the specific process carried out by a second MCU (Micro Controller Unit) according to the first embodiment.

The specific processing carried out by the second MCU 8 is as shown in FIG. 2, for example. First, in step S101, the second MCU 8 acquires the second input data which is data representing the input signal Sa, that is, input data corresponding to the input signal Sa. In step S102, the second MCU 8 generates the second control data Dc by encoding the second input data into data that cannot be decoded by the first MCU 7. In this case, for example, a method such as CRC can be used for the encoding. CRC is an abbreviation for Cyclic Redundancy Checking.

In step S103, the second MCU 8 sets the data reception time of the second control data Dc. The data reception time corresponds to the time at which the input signal Sa corresponding to the second control data Dc was input to the input module 3. In step S104, the second MCU 8 transmits the second control data Dc for which data reception time has been set to the first MCU 7. After step S104, the process ends. The second MCU 8 is configured to repeat this process at predetermined intervals.

Processing by First MCU 7

Figure 3:
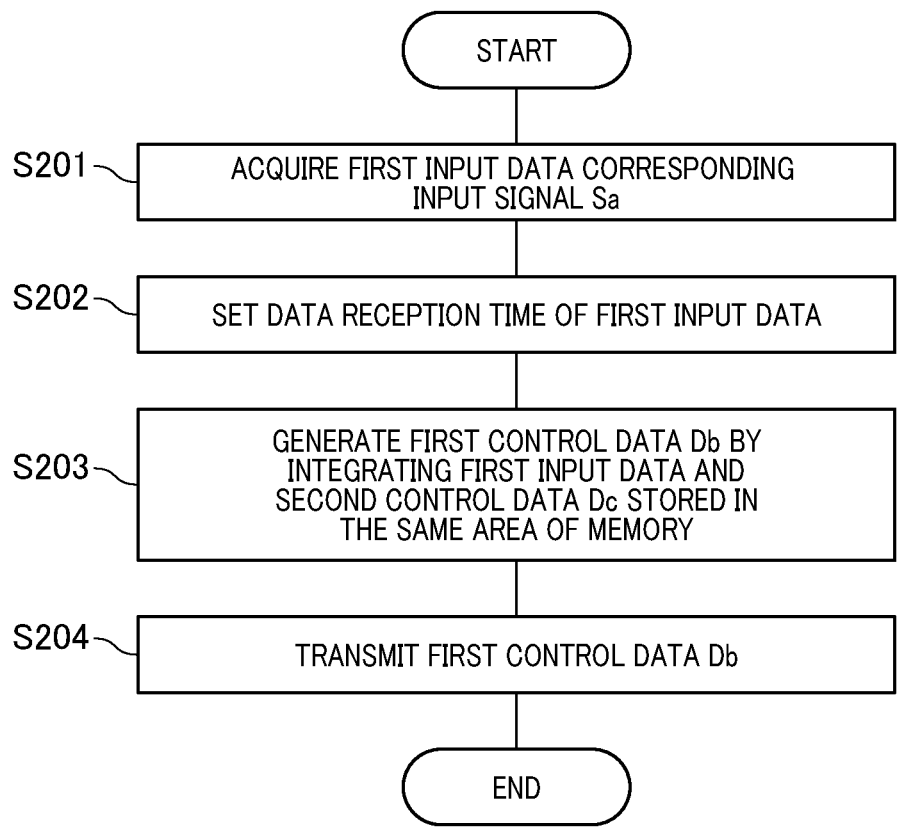
FIG. 3 is a flowchart showing an example of the specific process carried out by a first MCU according to the first embodiment.

The specific processing carried out by the first MCU 7 is as shown in FIG. 3, for example. First, in step S201, the first MCU 7 acquires the first input data which is data representing the input signal Sa, that is, input data corresponding to the input signal Sa. In step S202, the first MCU 7 sets the data reception time of the first control data Dc. The data reception time corresponds to the time at which the input signal Sa corresponding to the first control data was input to the input module 3.

In step S203, the first MCU 7 reads out the first input data and the second control data Dc stored in the same area of the memory, and then integrates the pieces of data together by concatenating them to generate the first control data db. In step S204, the first MCU 7 transmits the first control data db to the bus conversion IC 9. After step S204, the process ends. The first MCU 7 is configured to repeat this process at predetermined intervals.

Processing by Judging Unit 11 of CPU Module 2

Figure 4:
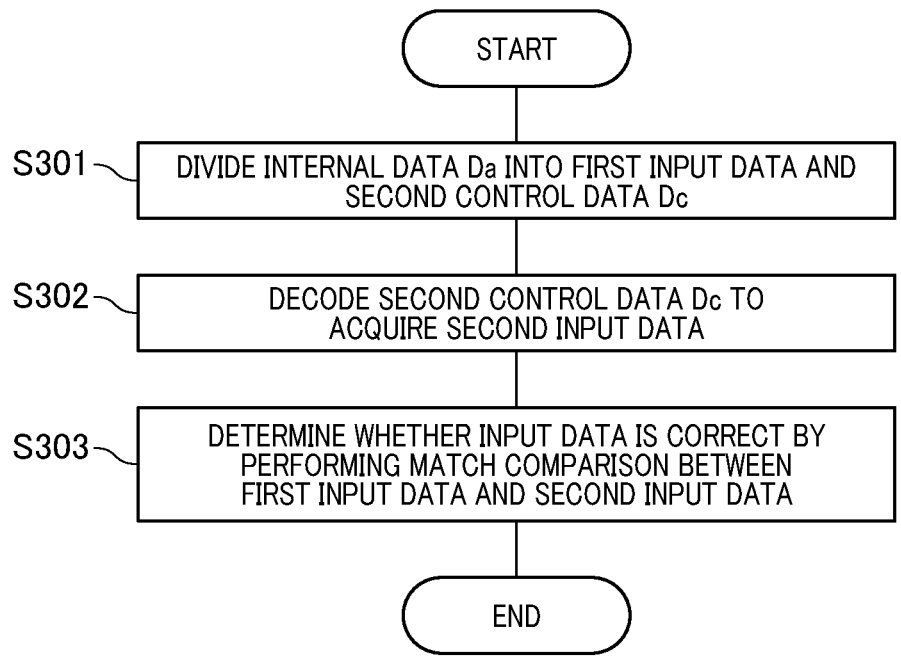
FIG. 4 is a flowchart showing an example of the specific process carried out by the judging unit of a CPU module according to the first embodiment.

The specific processing carried out by the judging unit 11 of the CPU module 2 is as shown in FIG. 4, for example. First, in step S301, the judging unit 11 divides the internal data Da sent from the input module 3 into the first input data and the second control data Dc. In step S302, the judging unit 11 acquires the second input data by decoding the second control data Dc.

In step S303, whether the input data is correct or not is determined by performing a match comparison between the first input data and the second input data extracted from the internal data Da as described above. When the input data is determined to be correct as a result of the comparison by the judging unit 11, the CPU module 2 carries out a predetermined process based on the input data. On the other hand, when it is determined that the input data is incorrect as a result of the comparison by the judging unit 11, the CPU module 2 carries out a fail-safe process such as stopping the communication to remain on the safe side. After step S303, the process ends. The judging unit 11 of the CPU module 2 is configured to repeat this process at predetermined intervals.

As described above, the present embodiment provides the following effects.

The input module 3 of this embodiment includes a first MCU 7, a second MCU 8, and a bus conversion IC 9. The first MCU 7 generates and outputs first control data db when the input signal Sa is input. The second MCU 8 generates and outputs second control data Dc when the input signal Sa is input. The bus conversion IC 9 generates internal data Da corresponding to the first control data db when the first control data db is input, and sends the internal data Da to the CPU module 2. Therefore, in the configuration of the present embodiment, the communication for taking the input signal Sa into the CPU module 2 is not physically duplicated.

However, in the above configuration, the components are provided with the following functions to realize virtual duplication that provides a function equivalent to that of physical duplication. Specifically, the second MCU 8 generates second control data Dc by encoding the second input data, which is input data corresponding to the input signal Sa, into data that cannot be decoded by the first MCU 7, and transmits the second control data Dc to the first MCU 7. The first MCU 7 generates the first control data db by integrating the first input data, which is input data corresponding to the input signal Sa, with the second control data Dc. Accordingly, the two MCUs, that is, the first MCU 7 and the second MCU 8 of the above configuration play different roles.

In the above configuration, the CPU module 2 includes a judging unit 11 having the function of decoding the second control data Dc. The judging unit 11 extracts the first input data and the second input data from the internal data Da, and determines whether the input data is correct by comparing the first input data and the second input data. In such a configuration, when there is an abnormality or failure in the second MCU 8, the second input data, and thus the second control data Dc, may become different from what it should have been due to the abnormality or failure. However, in such a case, the result of the match comparison carried out by the judging unit 11 will be a mismatch, and an input data error, that is, a communication error is detected.

Further, in the above configuration, when there is an abnormality or failure in the first MCU 7, the first input data may be different from what it should have been due to the abnormality or failure. However, in this case, the first MCU 7 cannot decode the second control data Dc transmitted from the second MCU 8. This makes it extremely unlikely that the second control data Dc is tampered with by the first MCU 7 in which an abnormality or failure has occurred. Therefore, in this case as well, the match comparison carried out by the judging unit 11 results in a mismatch, and an input data error, that is, a communication error is detected.

Thus, according to the configuration of the present embodiment, a function equivalent to that of a configuration in which the communication for taking the input signal Sa into the CPU module 2 is physically duplicated, more specifically, a mechanism capable of reliably detecting communication errors can be realized. According to the configuration of the present embodiment, an programmable logic controller capable of duplicating the communication for taking in input signals and capable of performing highly reliable communication can be provided.

Further, according to the configuration of the present embodiment, since highly reliable communication is possible, the PLC 1 can correspond to a black channel with regard to the communication path. Applying the black channel approach to communication error detection reduces the workloads of the first MCU 7 and the second MCU 8, reduces the safety reaction time, and, as a result, reduces the complexity of designing a functional safety product.

If there is a difference in timing between the first input data and the second input data, the result of match comparison performed by the judging unit 11 becomes a mismatch even if the input data is correct, and the input data may be erroneously determined to be incorrect. In particular, such a problem caused by a difference in timing is more prominent when the input signal Sa input from the outside is an analog signal. Taking this into account, in this embodiment, the pieces of data integrated together in the first MCU 7 are pieces of data corresponding to the input signals Sa of the same timing. This ensures that the first input data and the second input data compared by the judging unit 11 are pieces of data of the same time, which makes it possible to accurately determine whether the input data is correct or not by the match comparison performed by the judging unit 11 even when the input signal Sa is an analog signal.

In the configuration of the present embodiment, the first MCU 7 only needs to be capable of concatenating and transmitting the first input data and the second control data Dc, and it is not required to have a function such as comparing two pieces of data to check if they match. Further, the second MCU 8 only needs to be capable of encoding the second input data to generate and transmit the second control data Dc, and it is not required to have a function such as comparing two pieces of data to check if they match. Therefore, as the first MCU 7 and the second MCU 8, MCUs whose performance is relatively low in aspects such as computing power, that is, MCUs having simple functions can be adopted, which makes it possible to reduce the manufacturing cost of the input module 3.

Second Embodiment

Next, the second embodiment, which differs from the first embodiment in that the procedures carried out in the input module 3 and the CPU module 2 are changed, will be described with reference to FIGS. 5 and 6.

In the present embodiment, procedures such as the one for generating the first control data db by the first MCU 7 are different from those of the first embodiment. In this case, the first MCU 7 generates the first control data db by encoding the first input data into first encoded data, and integrating the first encoded data with the second control data Dc transmitted from the second MCU 8.

Specifically, the first MCU 7 reads out the first encoded data and the second control data Dc stored in the same area, and then integrates them together by concatenating them to generate the first control data db. In addition, in this case, the judging unit 11 of the CPU module 2 has the function of decoding the first encoded data. Therefore, the judging unit 11 is configured to acquire the first input data by decoding the first encoded data.

Next, the specific procedures carried out by the above configuration will be described with reference to FIGS. 5 to 6. Since the processing of the second MCU 8 is the same as that of the first embodiment, the description thereof will be omitted.

Processing by First MCU 7

Figure 5:
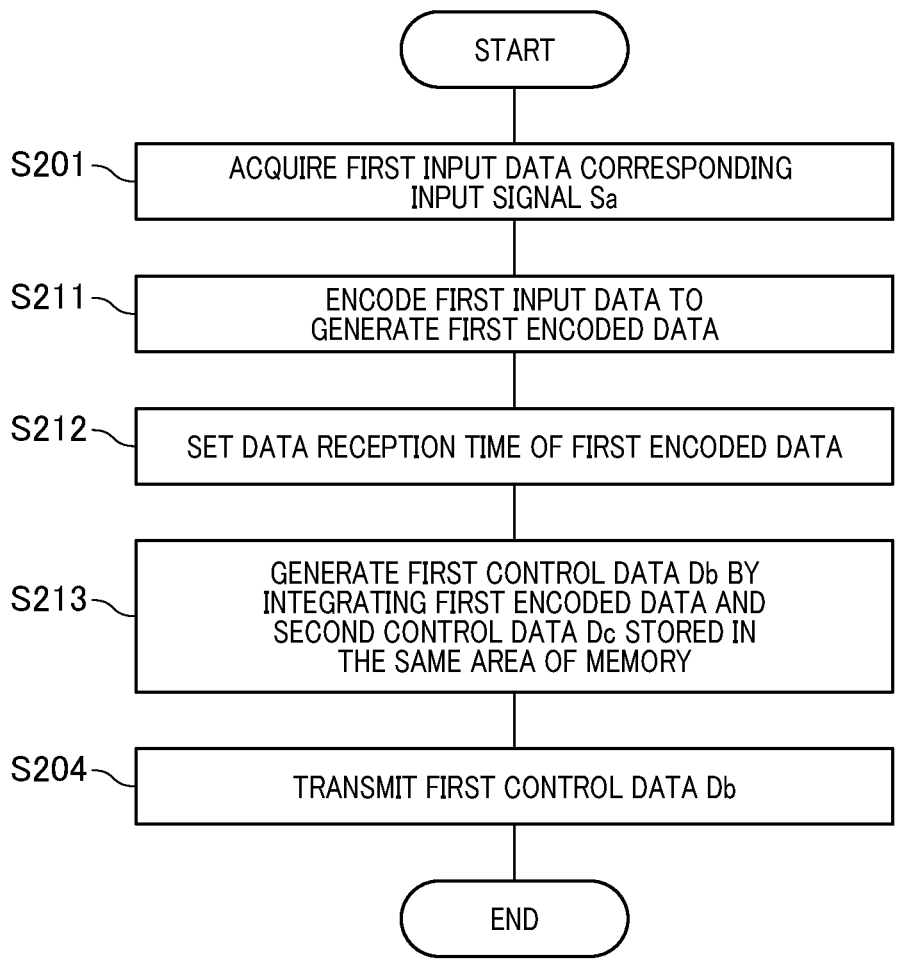
FIG. 5 is a flowchart showing an example of the specific process carried out by a first MCU according to the second embodiment.

The specific processing carried out by the first MCU 7 of the present embodiment is as shown in FIG. 5, for example. The processing of the present embodiment shown in FIG. 5 differs from the processing of the first embodiment shown in FIG. 3 in that steps S211, S212, and S213 are provided instead of steps S202 and S203. In this case, the process proceeds to step S211 after step S201.

In step S211, the first MCU 7 generates the first encoded data by encoding the first input data. In this case, for example, a method such as CRC can be used for the encoding. In step S212, the first MCU 7 sets the data reception time of the first encoded data. In step S213, the first MCU 7 reads out the first encoded data and the second control data Dc stored in the same area of the memory, and then integrates them together by concatenating them to generate the first control data db.

Processing by Judging Unit 11 of CPU Module 2

Figure 6:
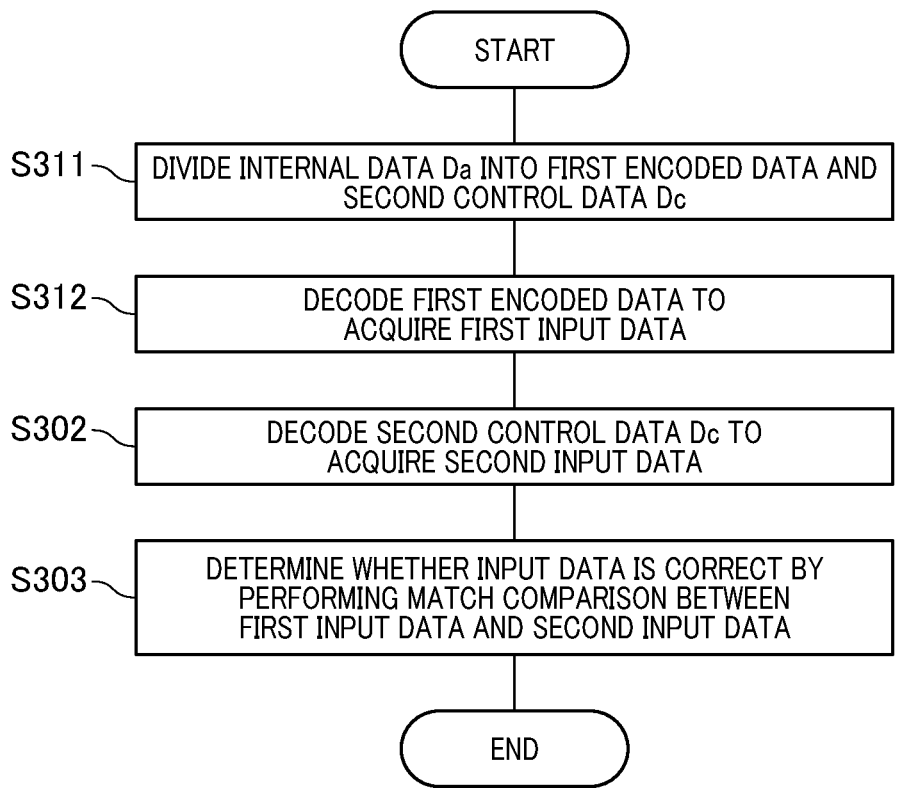
FIG. 6 is a flowchart showing an example of the specific process carried out by the judging unit of a CPU module according to the second embodiment.

The specific processing carried out by the judging unit 11 of the CPU module 2 of the present embodiment is as shown in FIG. 6, for example. The processing of the present embodiment shown in FIG. 6 differs from the processing of the first embodiment shown in FIG. 4 in that steps S311 and S312 are provided instead of step S301. In this case, first, step S311 is performed after starting the process. In step S311, the judging unit 11 divides the internal data Da sent from the input module 3 into the first encoded data and the second control data Dc. In step S312, the judging unit 11 acquires the first input data by decoding the first encoded data.

As with the first embodiment, the present embodiment described above can also realize a function similar to that of the configuration in which the communication for taking the input signal Sa into the CPU module 2 is physically duplicated, and therefore effects similar to those of the first embodiment can be obtained. The present embodiment also provides the following effects. That is, the first MCU 7 of this embodiment generates the first control data db by encoding the first input data into first encoded data, and integrating the first encoded data with the second control data Dc.

According to such a configuration, the first control data db, and thus the internal data Da transmitted from the input module 3 to the CPU module 2, is entirely encoded. This makes it difficult for, for example, a malicious third party to tamper with the data and improves its security. Further, the amount of the internal data Da of the present embodiment, in which all of the pieces of data are encoded as described above, can be reduced as compared with that of the internal data Da of the first embodiment in which a part of the data is encoded. In other words, the communication packet is compressed.

Therefore, according to the configuration of the present embodiment, it is possible to contribute in making improvements to the communication between the input module 3 and the CPU module 2 such as reducing the load and realizing high speed. Such effects provided by the present embodiment become even more effective when the amount of the input data corresponding to the input signal Sa is large because the effect of compressing the communication packet provided by encoding becomes more prominent.

Third Embodiment

Next, the third embodiment, which differs from the first embodiment in that the procedures carried out in the input module 3 and the CPU module 2 are changed, will be described with reference to FIGS. 7 and 8.

In the present embodiment, procedures such as the one for generating the first control data db by the first MCU 7 are different from those of the first embodiment. In this case, the first MCU 7 is configured to generate the first control data db by integrating the first input data with the second control data Dc and encoding them. In addition, in this case, the judging unit 11 of the CPU module 2 has the function of decoding the encoded first control data db. Therefore, the judging unit 11 is configured to acquire the first input data by decoding the internal data Da, and thus the first control data db.

Next, the specific procedures carried out by the above configuration will be described with reference to FIGS. 7 to 8. Since the processing of the second MCU 8 is the same as that of the first embodiment, the description thereof will be omitted.

Processing by First MCU 7

Figure 7:
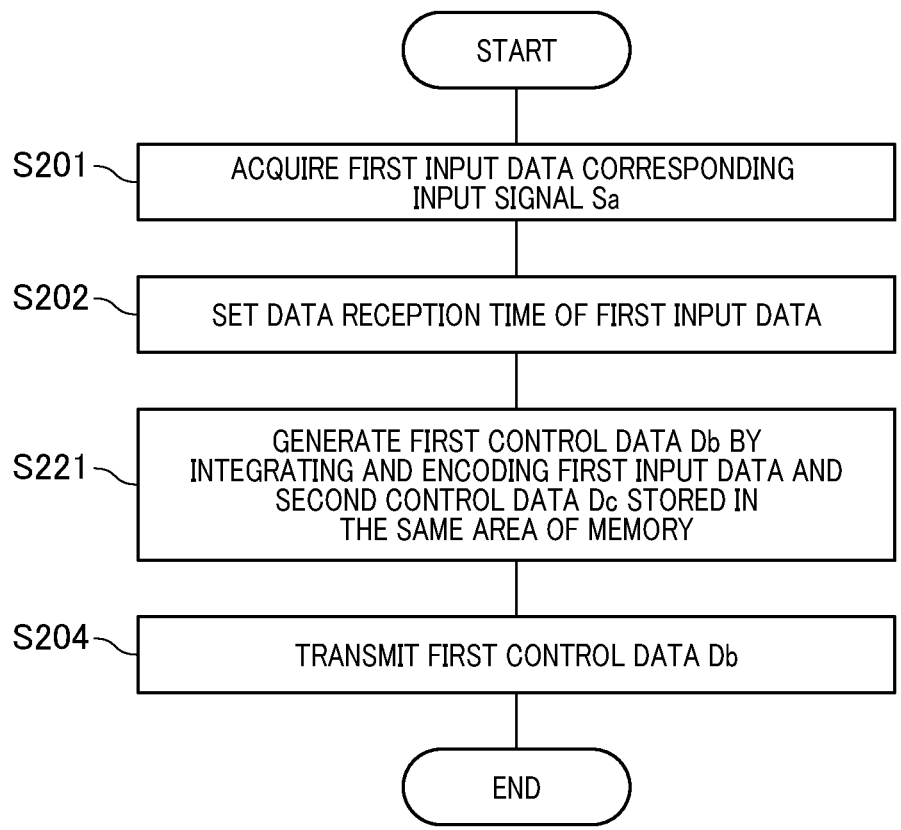
FIG. 7 is a flowchart showing an example of the specific process carried out by a first MCU according to the third embodiment.

The specific processing carried out by the first MCU 7 of the present embodiment is as shown in FIG. 7, for example.

The processing of the present embodiment shown in FIG. 7 differs from the processing of the first embodiment shown in FIG. 3 in that step S221 is provided instead of step S203. In step S221, the first MCU 7 reads out the first input data and the second control data Dc stored in the same area of the memory. Then, it integrates the pieces of data together by concatenating them, and also encodes them to generate the first control data db. In this case, for example, a method such as CRC can be used for the encoding.

Processing by Judging Unit 11 of CPU Module 2

Figure 8:
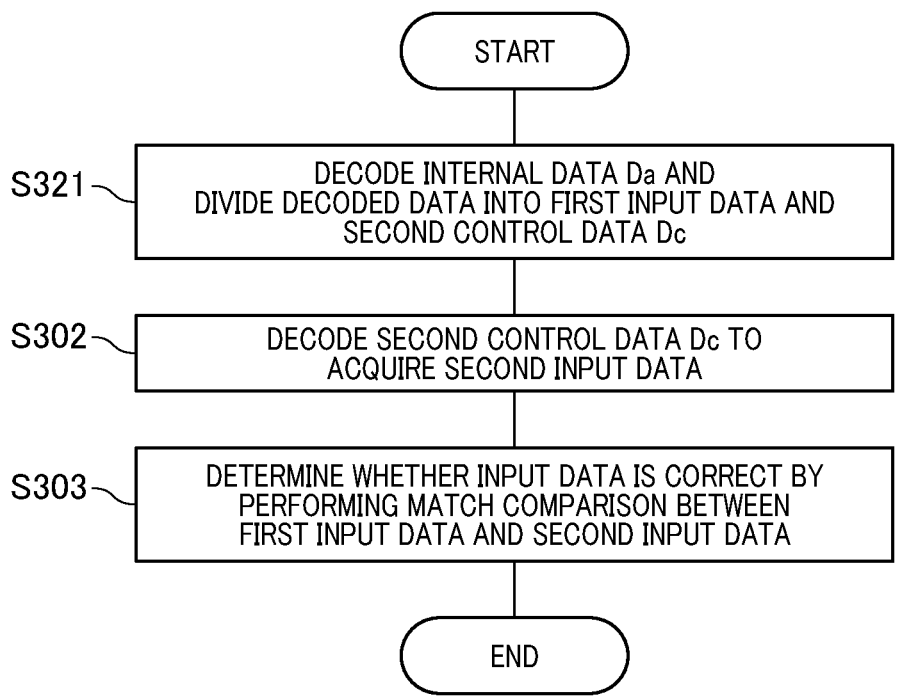
FIG. 8 is a flowchart showing an example of the specific process carried out by the judging unit of a CPU module according to the third embodiment.

The specific processing carried out by the judging unit 11 of the CPU module 2 of the present embodiment is as shown in FIG. 8, for example. The processing of the present embodiment shown in FIG. 8 differs from the processing of the first embodiment shown in FIG. 4 in that step S321 is provided instead of step S301. In step S321, the judging unit 11 decodes the internal data Da sent from the input module 3 and divides the decoded data into the first input data and the second control data Dc.

As with the first embodiment, the present embodiment described above can also realize a function similar to that of a configuration in which the communication for taking the input signal Sa into the CPU module 2 is physically duplicated, and therefore effects similar to those of the first embodiment can be obtained. The present embodiment also provides the following effects. That is, the first MCU 7 of the present embodiment is configured to generate the first control data db by integrating the first input data with the second control data Dc and encoding them.

According to such a configuration, the first control data db, and thus the internal data Da transmitted from the input module 3 to the CPU module 2, are all encoded data. This makes it difficult for, for example, a malicious third party to tamper with the data and improves its security. Further, the amount of the internal data Da of the present embodiment, in which all of the pieces of data are encoded as described above, can be reduced as compared with that of the internal data Da of the first embodiment in which a part of the data is encoded. In other words, the communication packet is compressed.

Therefore, according to the configuration of the present embodiment, it is possible to contribute in making improvements to the communication between the input module 3 and the CPU module 2 such as reducing the load and realizing high speed. Such effects provided by the present embodiment become even more effective when the amount of the input data corresponding to the input signal Sa is large because the effect of compressing the communication packet provided by encoding becomes more prominent.

Fourth Embodiment

Next, the fourth embodiment, which differs from the second embodiment in that the procedures carried out in the input module 3 and the CPU module 2 are changed, will be described with reference to FIGS. 9 and 10.

In the present embodiment, procedures such as the one for generating the first control data db by the first MCU 7 are different from those of the second embodiment.

In this case, the first MCU 7 is configured to generate the first control data db by integrating the first encoded data with the second control data Dc, and encoding them in a manner that is different from how the first encoded data was generated, that is, encoding them using a different encryption table. In addition, in this case, the judging unit 11 of the CPU module 2 has the function of decoding the first control data db. Therefore, the judging unit 11 is configured to acquire the first input data by decoding the internal data Da, and thus the first control data db, and also decoding the first encoded data.

Next, the specific procedures carried out by the above configuration will be described with reference to FIGS. 9 to 10. Since the processing of the second MCU 8 is the same as that of the first embodiment, the description thereof will be omitted.

Processing by First MCU 7

Figure 9:
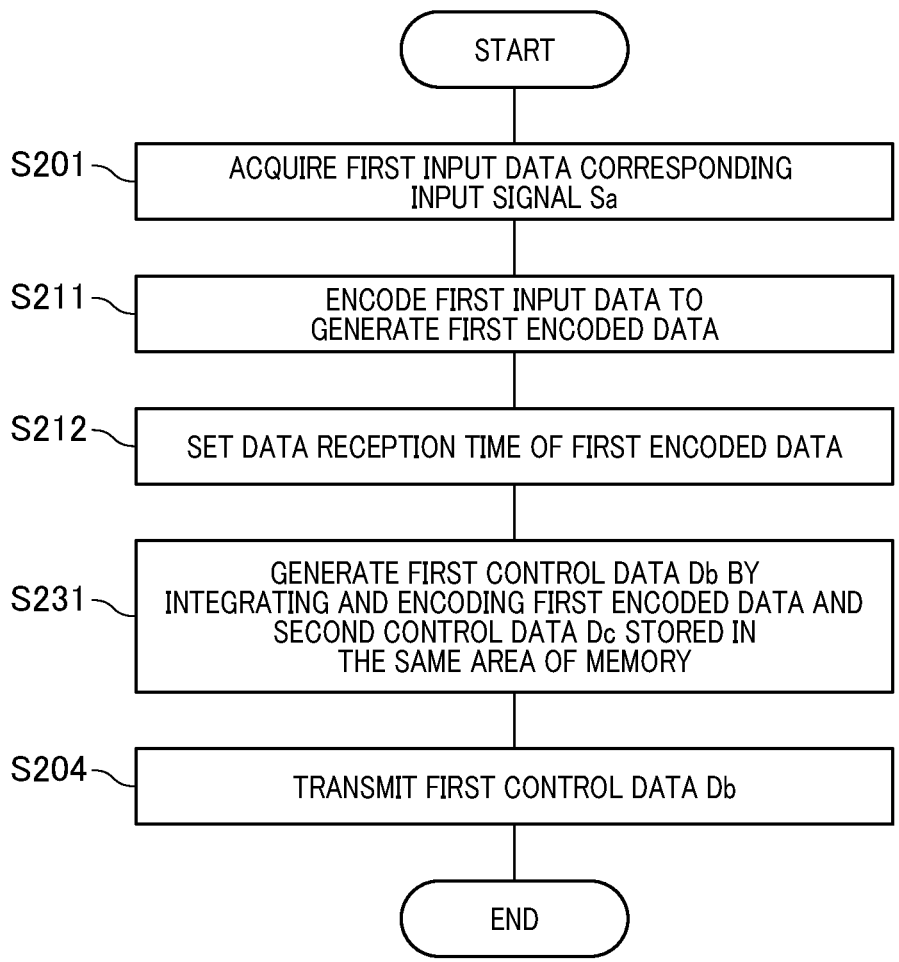
FIG. 9 is a flowchart showing an example of the specific process carried out by a first MCU according to the fourth embodiment.

The specific processing carried out by the first MCU 7 of the present embodiment is as shown in FIG. 9, for example.

The processing of the present embodiment shown in FIG. 9 differs from the processing of the second embodiment shown in FIG. 5 in that step S231 is provided instead of step S213. In step S231, the first MCU 7 reads out the first encoded data and the second control data Dc stored in the same area of the memory. Then, it integrates the pieces of data together by concatenating them, and also encodes them to generate the first control data db. In this case, for example, a method such as CRC can be used for the encoding.

Processing by Judging Unit 11 of CPU Module 2

Figure 10:
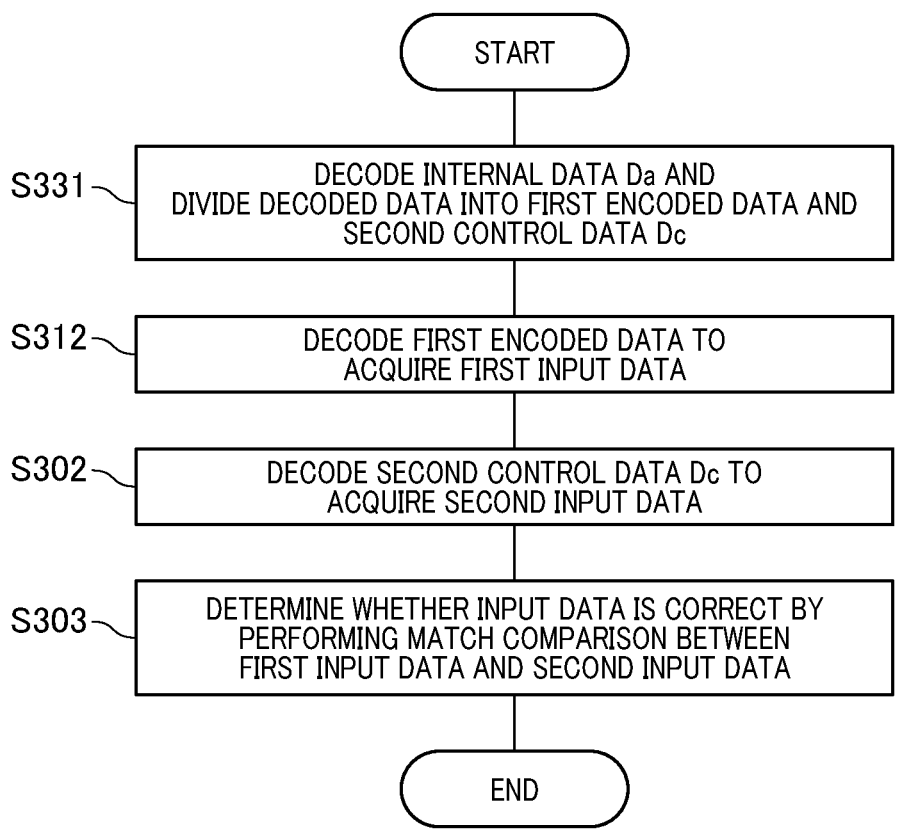
FIG. 10 is a flowchart showing an example of the specific process carried out by the judging unit of a CPU module according to the fourth embodiment.

The specific processing carried out by the judging unit 11 of the CPU module 2 of the present embodiment is as shown in FIG. 10, for example. The processing of the present embodiment shown in FIG. 10 differs from the processing of the second embodiment shown in FIG. 6 in that step S331 is provided instead of step S311. In step S331, the judging unit 11 decodes the internal data Da sent from the input module 3 and divides the decoded data into the first encoded data and the second control data Dc.

As with the first embodiment, the present embodiment described above can also realize a function similar to that of a configuration in which the communication for taking the input signal Sa into the CPU module 2 is physically duplicated, and therefore effects similar to those of the first embodiment can be obtained. The present embodiment also provides the following effects. That is, the first MCU 7 of this embodiment is configured to generate the first control data db by integrating the first encoded data with the second control data Dc, and encoding them in a manner that is different from how the first encoded data was generated. That is, in this case, the first control data db, and thus the internal data Da, is generated by being encoded twice with respect to the original first input data and second input data.

Therefore, according to the configuration of the present embodiment, for example, it becomes more difficult for a malicious third party to tamper with the data, and its security is further improved. Further, according to the configuration of the present embodiment, since the amount of the internal data Da can be further reduced owing to the double encoding, it is possible to contribute in making improvements to the communication between the input module 3 and the CPU module 2 such as further reducing the load and realizing an even higher speed. Such effects provided by the present embodiment become even more effective when the amount of the input data corresponding to the input signal Sa is large because the effect of compressing the communication packet provided by encoding becomes more prominent.

Fifth Embodiment

Next, the fifth embodiment, which differs from the second embodiment in that the procedures carried out in the input module 3 are changed, will be described with reference to FIGS. 11 and 12.

In the present embodiment, procedures such as the procedure for generating the first control data db by the first MCU 7 and the procedure for generating the second control data Dc by the second MCU 8 are different from those of the second embodiment.

In this case, the second MCU 8 generates a time stamp when encoding the second input data, and adds the time stamp to the second control data Dc. Further, in this case, the first MCU 7 generates a time stamp when encoding the first input data, and adds the time stamp to the first encoded data. The first MCU 7 generates the first control data db by integrating first encoded data and second control data Dc to which time stamps representing the same time period are assigned by concatenating them. The pieces of data integrated together in the first MCU 7 of the present embodiment are therefore pieces of data corresponding to the input signals Sa of the same timing, in other words, the integrated pieces of data are synchronized.

Next, the specific procedures carried out by the above configuration will be described with reference to FIGS. 11 to 12. Since the processing of the judging unit 11 of the CPU module 2 is the same as that of the first embodiment, the description thereof will be omitted.

Processing by Second MCU 8

Figure 11:
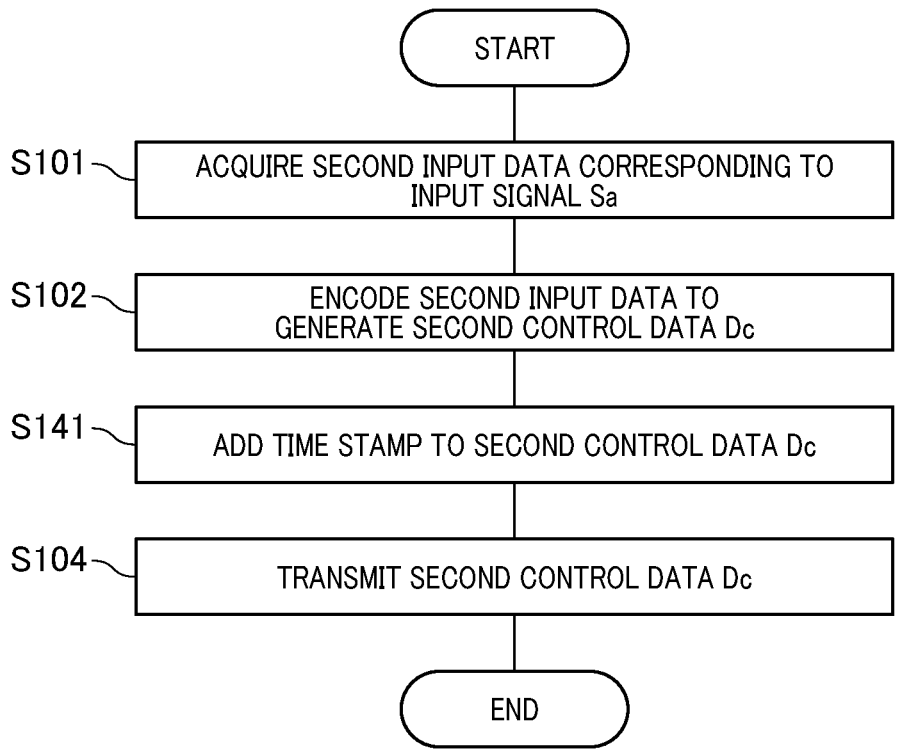
FIG. 11 is a flowchart showing an example of the specific process carried out by a second MCU according to the fifth embodiment.

The specific processing carried out by the second MCU 8 of the present embodiment is as shown in FIG. 11, for example. The processing of the present embodiment shown in FIG. 11 differs from the processing of the first embodiment shown in FIG. 2 in that step S141 is provided instead of step S103. In step S141, the second MCU 8 adds the time stamp generated upon encoding to the second control data Dc.

Processing by First MCU 7

Figure 12:
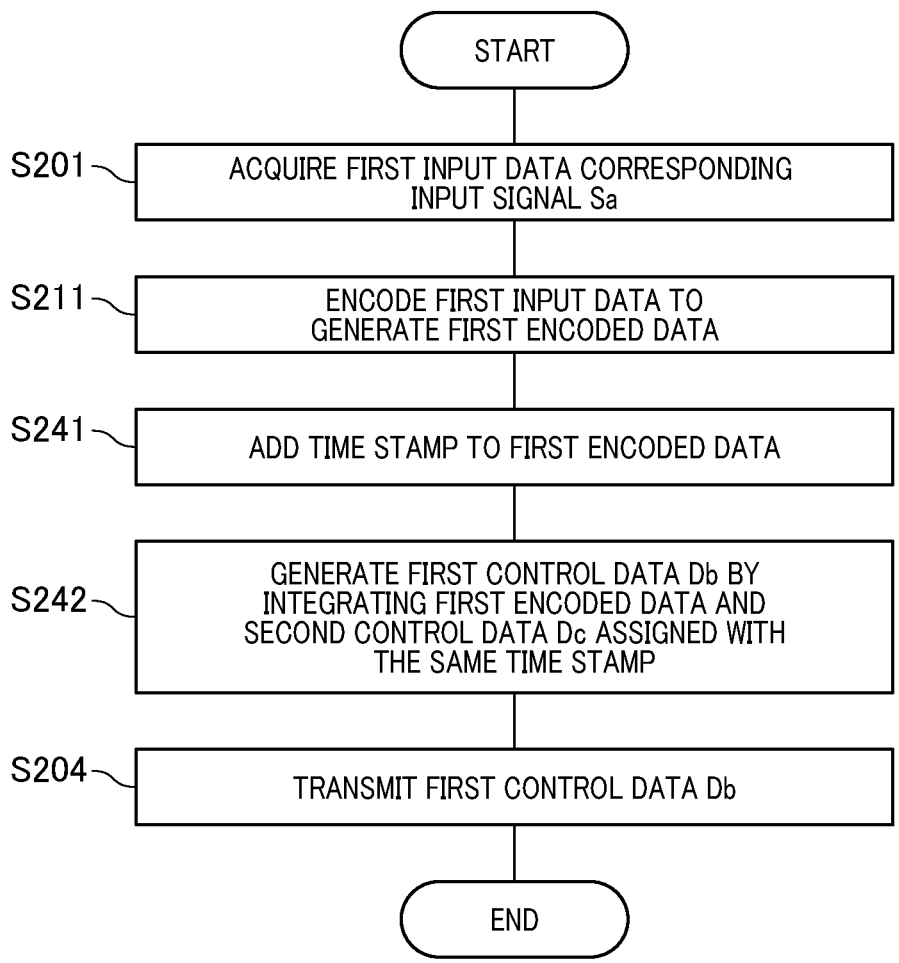
FIG. 12 is a flowchart showing an example of the specific process carried out by a first MCU according to the fifth embodiment.

The specific processing carried out by the first MCU 7 of the present embodiment is as shown in FIG. 12, for example. The processing of the present embodiment shown in FIG. 12 differs from the processing of the second embodiment shown in FIG. 5 in that steps S241 and S242 are provided instead of steps S212 and S213. In step S241, the first MCU 7 adds the time stamp generated upon encoding to the first encoded data. In step S242, the first MCU 7 generates the first control data db by integrating first encoded data and second control data Dc to which the same time stamps are assigned by concatenating them.

As with the first embodiment, the present embodiment described above can also realize a function similar to that of a configuration in which the communication for taking the input signal Sa into the CPU module 2 is physically duplicated. In addition, in this embodiment as well, the pieces of data integrated together in the first MCU 7 are pieces of data corresponding to the input signals Sa of the same timing. Therefore, as with the first embodiment, the present embodiment also ensures that the first input data and the second input data compared by the judging unit 11 are pieces of data of the same time, which makes it possible to accurately determine whether the input data is correct or not by the match comparison performed by the judging unit 11 even when the input signal Sa is an analog signal.

Sixth Embodiment

Next, the sixth embodiment will be described with reference to FIG. 13.

Figure 13:
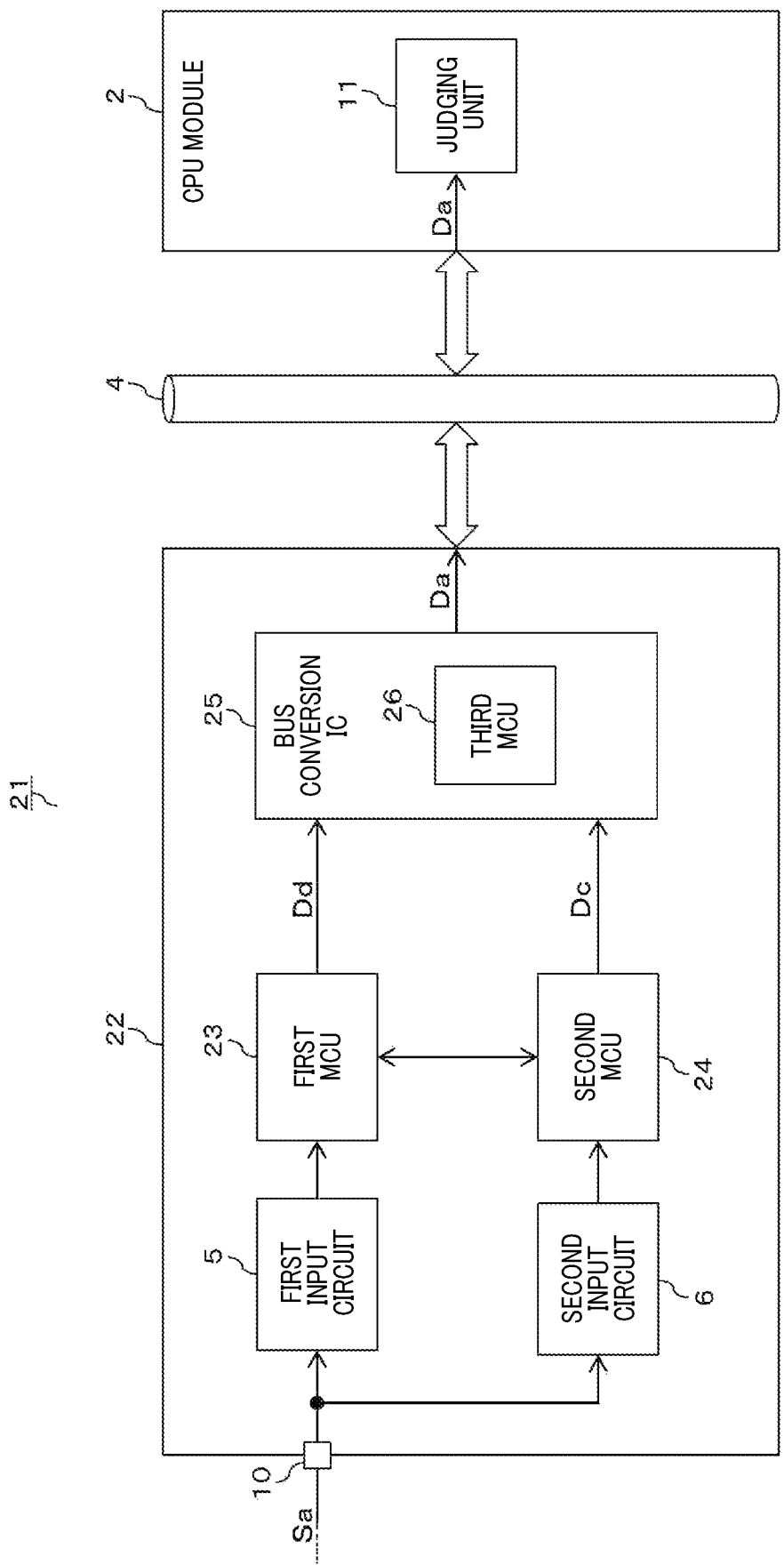
FIG. 13 is a diagram schematically showing the configuration of a PLC according to the sixth embodiment.

As shown in FIG. 13, an input module 22 of a PLC 21 according to the present embodiment differs from the input module 3 of the first embodiment in that a first MCU 23, a second MCU 24, and a bus conversion IC 25 are provided instead of the first MCU 7, the second MCU 8, and the bus conversion IC 9. The bus conversion IC 25 is more multifunctional than the bus conversion IC 9, and it includes a third MCU 26.

As with the first MCU 7, the first MCU 23 acquires first input data, which is input data corresponding to the input signal Sa, by performing A/D conversion and other processing on the input signal Sa. The first MCU 23 generates first encoded data Dd by encoding the first input data. The first MCU 23 generates a time stamp when encoding the first input data, and adds the time stamp to the first encoded data Dd. The first MCU 23 transmits the generated first encoded data Dd to the third MCU 26 of the bus conversion IC 25.

As with the second MCU 8, the second MCU 24 serves as a second control unit. That is, the second MCU 24 acquires second input data, which is input data corresponding to the input signal Sa, by performing A/D conversion and other processing on the input signal Sa. The second MCU 24 generates the second control data Dc by encoding the second input data into data that cannot be decoded by the third MCU 26. The second MCU 24 generates a time stamp when encoding the second input data, and adds the time stamp to the second control data Dc. The second MCU 24 transmits the second control data Dc to the third MCU 26 of the bus conversion IC 25.

The third MCU 26 of the bus conversion IC 25 generates the first control data db by integrating the first encoded data Dd and the second control data Dc to which time stamps of the same time period are assigned by concatenating them. The pieces of data integrated together in the third MCU 26 are therefore pieces of data corresponding to the input signals Sa of the same timing, in other words, the integrated pieces of data are synchronized. In this embodiment, the first MCU 23 and the third MCU 26 cooperate with each other to function as a first control unit.

As with the bus conversion IC 9, the third MCU 26 of the bus conversion IC 25 converts the first control data db into internal data Da such as a communication packet in accordance with the communication. That is, the bus conversion IC 25 generates and outputs internal data Da corresponding to the first control data db when the first control data db is input, and it serves as a data generating unit. The bus conversion IC 25 of the third MCU 26 transmits communication data including the generated internal data Da to the CPU module 2 by communication.

As with the first embodiment, the present embodiment described above can also realize a function similar to that of a configuration in which the communication for taking the input signal Sa into the CPU module 2 is physically duplicated. In addition, in this embodiment as well, the pieces of data integrated together in the third MCU 26 are pieces of data corresponding to the input signals Sa of the same timing. Therefore, as with the first embodiment, the present embodiment also ensures that the first input data and the second input data compared by the judging unit 11 are pieces of data of the same time, which makes it possible to accurately determine whether the input data is correct or not by the match comparison performed by the judging unit 11 even when the input signal Sa is an analog signal.

Other Embodiments

The present disclosure is not limited to the embodiments described above and illustrated in the drawings, and the embodiments can be modified, combined, or extended as appropriate without departing from the gist thereof.

The specifics of the embodiments such as numerical values are merely examples, and the present disclosure is not limited thereto.

In the above-described embodiments, the first and second MCUs have been described as the hardware forming the first and second control units, but the present disclosure is not limited thereto. For example, the first and second control units can be implemented using any appropriate semiconductor integrated circuit such as arithmetic units other than MCUs, such as PLDs (Programmable Logic Devices), for example, FPGAs (Field Programmable Gate Arrays) or FPAAs (Field Programmable Analog Arrays), ASICs (Application Specific Integrated Circuits), or CPUs (Central Processing Units).

In the above-described embodiments, the pieces of data integrated in the first MCU 7 or the third MCU 26 are synchronized so that they correspond to input signals Sa of the same timing. However, for example, when the input signals Sa are digital signals, it may not be necessary to synchronize the pieces of data in such a manner.

Further, in the above-described embodiments, the first control data db has been described as an integration of the first input data and the second control data Dc, but the present disclosure is not limited to this. The first control data db suffices if it includes the first input data and the second control data Dc, and they do not necessarily need to be integrated. The first control data db may include two or more separate pieces of partial data. For example, the first control data db may separately include partial data corresponding to the first input data and partial data corresponding to the second control data Dc. These pieces of partial data may be transmitted to the CPU module 2 separately at different timings as long as they are used for the match comparison in the CPU module 2.

The data encoding method is not limited to CRC, and it suffices if the computation is somewhat complicated, advanced, or the like.

What is claimed is:

1. A programmable logic controller comprising:
    an input module that receives an input signal that is inputted externally and that comprises first and second control units that process, respectively, first and second input data both obtained from the input signal, the first and second input data being presented at signal levels that can be processed in the first and second control units, respectively; and
    a CPU module configured to communicate with the input module via a communication line, wherein:
    the second control unit generates second control data by encoding the second input data into the second control data and transmits the generated second control data to the first control unit, the first control unit being unable to decode the second control data;
    the first control unit generates first control data by integrating the first input data with the second control data;
    the input module generates internal data based on the generated first control data and transmits the internal data to the CPU module via the communication line; and
    the CPU module divides the received internal data into the first input data and the second control data, acquires the second input data by decoding the second control data, and thereby extracts the first input data and the second input data from the internal data to determine whether the first input data and the second input data are correct by performing match comparison between the first input data and the second input data extracted from the internal data.

2. The programmable logic controller according to claim 1, wherein
    the input module comprises a conversion circuit that converts the generated first control data outputted from the first control unit to the internal data to be transmitted to the CPU module via the communication line.

3. The programmable logic controller according to claim 2, wherein the first control unit is configured to generate first encoded data by encoding the first input data into the first encoded data, and the first control unit is configured to integrate the first encoded data with the second control data to thereby generate the first control data.

4. The programmable logic controller according to claim 2, wherein the first control unit is configured to integrate the first input data with the second control data to generate integrated data and to encode the integrated data to thereby generate the first control data.

5. The programmable logic controller according to claim 2, wherein the first input data and the second control data included in the first control data are composed of pieces of data corresponding to input signals acquired at the same timing.

6. The programmable logic controller according to claim 3, wherein the first control unit is configured to integrate the first encoded data with the second control data to thereby generate the first control data, and the first control unit is configured to encode the first control data differently from when the first input data is encoded into the first encoded data.

7. The programmable logic controller according to claim 1, wherein
    the input module comprises (i) a first input circuit that converts the input signal to the first input data at a first level at which the input signal is allowed to be inputted to the first control unit and (ii) a second input circuit that converts the input signal to the second input data at a second level at which the input signal is allowed to be inputted to the second control unit.

8. The programmable logic controller according to claim 7, wherein
the input module comprises a conversion circuit that converts the generated first control data outputted from the first control unit to the internal data to be transmitted to the CPU module via the communication line.

9. The programmable logic controller according to claim 8, wherein
the first control unit is configured to generate first encoded data by encoding the first input data into the first encoded data, and the first control unit is configured to integrate the first encoded data with the second control data to thereby generate the first control data.

10. The programmable logic controller according to claim 8, wherein
the first control unit is configured to integrate the first input data with the second control data to generate integrated data and to encode the integrated data to thereby generate the first control data.

11. The programmable logic controller according to claim 8, wherein
the first input data and the second control data included in the first control data are composed of pieces of data corresponding to input signals acquired at the same timing.

* * * * *